United States Patent
Banerjee et al.

(10) Patent No.: US 12,483,475 B2
(45) Date of Patent: Nov. 25, 2025

(54) REDUCING SYSTEM DEGRADATION CAUSED BY MANIPULATIVE NETWORK FUNCTIONS

(71) Applicant: Nokia Solutions and Networks Oy, Espoo (FI)

(72) Inventors: Anubhab Banerjee, Munich (DE); Stephen Mwanje, Munich (DE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 18/561,865

(22) PCT Filed: May 24, 2021

(86) PCT No.: PCT/IB2021/054486
§ 371 (c)(1),
(2) Date: Nov. 17, 2023

(87) PCT Pub. No.: WO2022/248905
PCT Pub. Date: Dec. 1, 2022

(65) Prior Publication Data
US 2024/0243972 A1  Jul. 18, 2024

(51) Int. Cl.
*H04L 41/0823* (2022.01)
*H04L 41/16* (2022.01)

(52) U.S. Cl.
CPC .......... *H04L 41/0836* (2013.01); *H04L 41/16* (2013.01)

(58) Field of Classification Search
CPC ... H04L 41/0836; H04L 41/16; H04L 41/147; H04W 24/02

(Continued)

(56) References Cited

U.S. PATENT DOCUMENTS

| 9,332,458 B2 * | 5/2016 | Nuss | H04W 16/22 |
| 11,009,836 B2 * | 5/2021 | Hoffmann | G05B 13/0265 |

(Continued)

FOREIGN PATENT DOCUMENTS

| WO | 2021/213644 A1 | 10/2021 |
| WO | 2022/174918 A1 | 8/2022 |
| WO | 2022/248906 A1 | 12/2022 |

OTHER PUBLICATIONS

Office action received for corresponding European Patent Application No. 21729018.8, dated Feb. 3, 2025, 4 pages.

(Continued)

*Primary Examiner* — Wing F Chan
*Assistant Examiner* — John Fan
(74) *Attorney, Agent, or Firm* — Nokia Technologies Oy

(57) ABSTRACT

Method comprising: receiving information on a current system state; retrieving stored triples for a configuration parameter of the system; predicting an expected value of the configuration parameter based on the current state and the stored triples; receiving a calculated optimized value for the configuration parameter; reducing a potential degradation of a system performance based on the expected value and the calculated optimized value, wherein each of the triples comprises an information on a previous system state, an applied value of the configuration parameter, and a previous OCRS for the configuration parameter; each of the OCRSs indicates a respective range of previously desired values for the configuration parameter; the potential deterioration compares a first performance of the system under an assumption that none of the cognitive functions has manipulative behavior with a second performance of the system under an assumption that at least one of the cognitive functions has manipulative behavior.

12 Claims, 13 Drawing Sheets

(58) Field of Classification Search
USPC .......................................................... 709/221
See application file for complete search history.

(56) References Cited

U.S. PATENT DOCUMENTS

| | | | |
|---|---|---|---|
| 11,487,337 B2* | 11/2022 | Tomoda | G06N 7/01 |
| 2018/0192936 A1* | 7/2018 | Widge | A61N 1/36139 |
| 2019/0108041 A1* | 4/2019 | D'Ercoli | G06F 9/4451 |
| 2019/0273662 A1 | 9/2019 | Mwanje et al. | |
| 2022/0027789 A1 | 1/2022 | Banerjee et al. | |

OTHER PUBLICATIONS

Banerjee et al., "Game theoretic Conflict Resolution Mechanism for Cognitive Autonomous Networks", International Symposium on Performance Evaluation of Computer & Telecommunication Systems (SPECTS), Jul. 20-22, 2020, 8 pages.

Banerjee et al., "RAN Cognitive Controller", arXiv, Oct. 20, 2020, 2 pages.

Banerjee et al., "Optimal Configuration Determination in Cognitive Autonomous Networks", IFIP/IEEE International Symposium on Integrated Network Management (IM), May 17-21, 2021, pp. 494-500.

International Search Report and Written Opinion received for corresponding Patent Cooperation Treaty Application No. PCT/IB2021/054486, dated Feb. 23, 2022, 16 pages.

Mwanje et al., "Environment Modeling and Abstraction of Network States for Cognitive Functions", NOMS IEEE/IFIP Network Operations and Management Symposium, Apr. 20-24, 2020, 8 pages.

Aisha et al., "Mitigating the Effect of Malicious Users in Cognitive Networks", 11th International Conference on Frontiers of Information Technology, Dec. 16-18, 2013, pp. 7-12.

\* cited by examiner

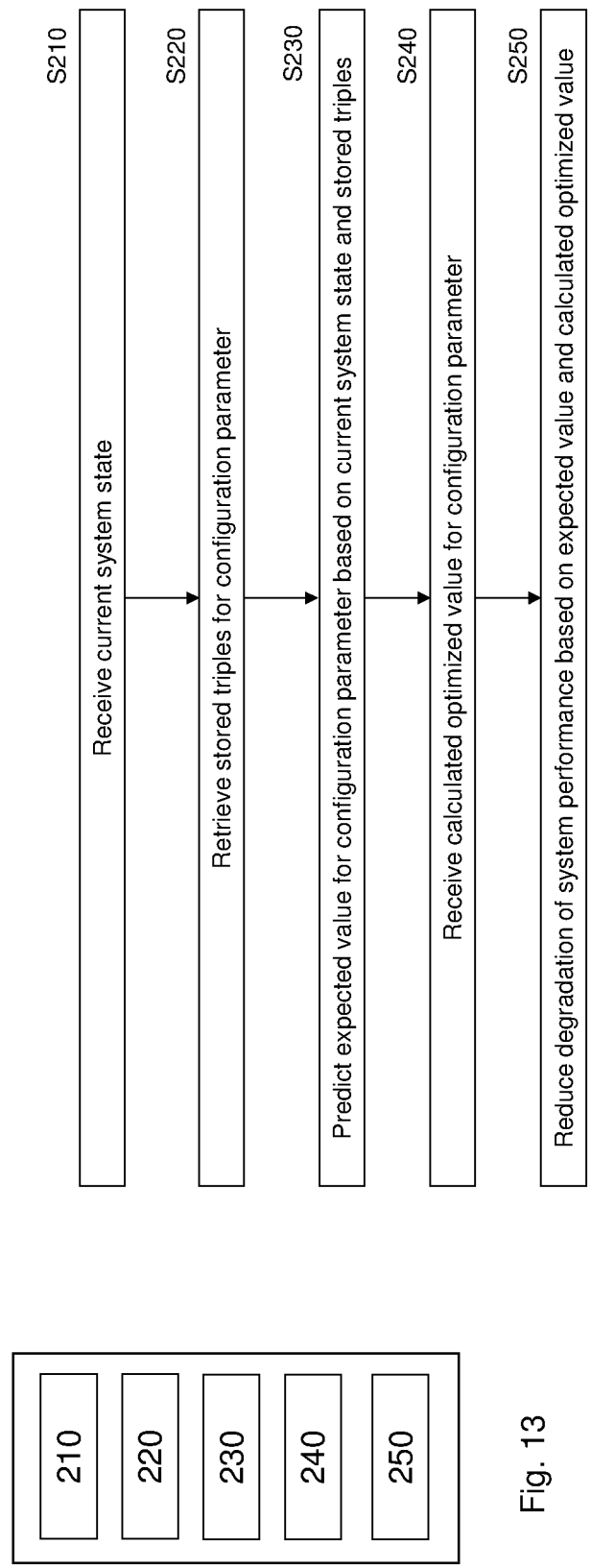

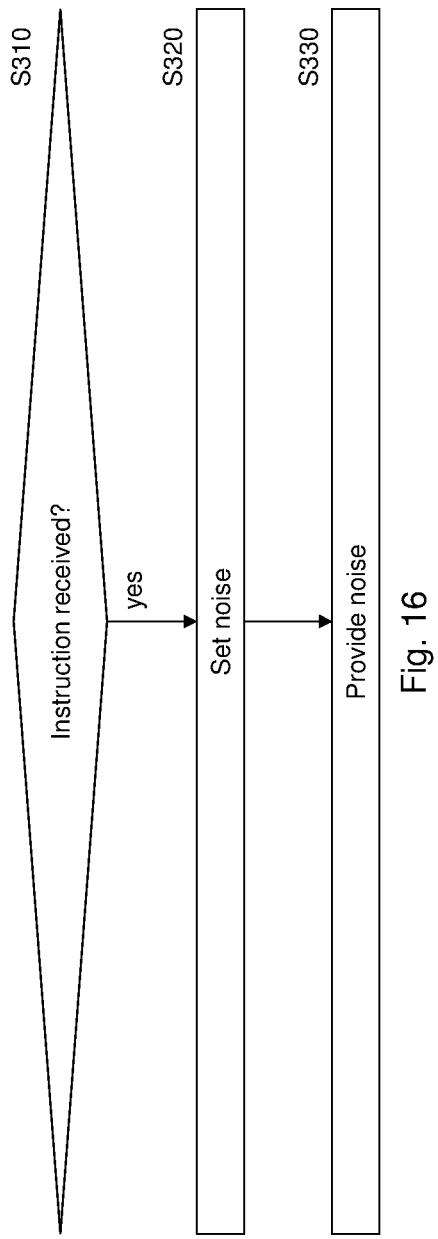
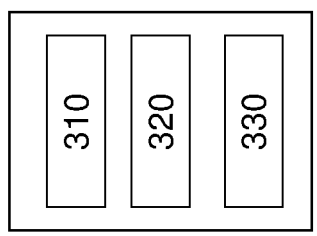
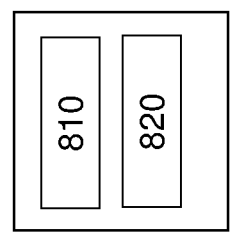

REDUCING SYSTEM DEGRADATION CAUSED BY MANIPULATIVE NETWORK FUNCTIONS

RELATED APPLICATION

This application claims priority to PCT Application No. PCT/IB2021/054486, filed on May 24, 2021, which is incorporated herein by reference in its entirety.

FIELD OF THE INVENTION

The present disclosure relates to cognitive autonomous networks. In particular, it is related to manipulative (rogue) cognitive functions.

Abbreviations

3GPP 3$^{rd}$ Generation Partnership Project
4G/5G/6G 4$^{th}$/5$^{th}$/6$^{th}$ Generation
BAD Behavioral Anomaly Detection
CAN Cognitive Autonomous Network
CCO Coverage and Capacity Optimization
CF Cognitive Function
CM Configuration Manager
CPC Configuration Parameter Camouflaging
CPT Configuration Parameter Tracking
CW Configuration Weight
DM DoD Manager
DoD Degree of Dynamicity
EG(S) Eisenberg-Gale (Solution)
ESM Energy Savings Mode
HO Handover
KPI Key Performance Indicator
MAS Multi Agent System
MASCP Maximum Allowable System Compromise Percentage
MLA Machine Learning Algorithm
MLB Mobility Load Balancing
MNO Mobile Network Operator
MRO Mobility Robustness Optimization
MSE Mean Square Error
NAF Network Automation Function
NN Neural Networks
OCRS Optimal Configuration Range Set
RAN Radio Access Network
SON Self Organizing Network
SF SON Function
TTT Time-to-Trigger
TXP Transmission Point
UF Utility Function

BACKGROUND

In mobile networks, rule based network automation has been successfully introduced by Self Organizing Networks (SON). The NAFs in SON (also called SON Functions (SF)) are limited to two basic aspects—(i) they cannot adapt themselves because of their rule based behavior (e.g. in a rapidly changing environment), and, (ii) existence of a large number of rules makes maintenance and upgrade of the system difficult.

To overcome the limitations of SON, Cognitive Autonomous Networks (CAN) are being promoted. In a CAN, the SFs of SON are replaced by Cognitive Functions (CFs). These CFs, being learning agents themselves, act based on their learning and do not follow any fixed set of rules. A CF can determine the best network configuration for itself in a certain network state. The CF may periodically check if the network state has changed. Each period is denoted as a cycle. If the network state has not changed, then it continues its learning until the end of the next cycle. If the network state has changed, the CF computes desired (nearly) optimal values of its input configurations and compares them with the values set at the system. If they are the same, the CF does nothing and continues learning until the end of the next cycle. Otherwise, the CF initiates a process to implement the desired configuration. In the process, the CF uses two values: an Optimal Configuration Range Set (OCRS) which is a set of values of the specific network configuration parameters for which the objective of the CF is optimal or close to optimal, and a Utility Function (UF) which maps the output of a CF to a universal predefined scale like [0:10]). Such a CF is called a Requesting CF and shown in FIG. 1.

The universal predefined scale aims at making the quality of the configurations comparable. Namely, different CFs have different objectives and KPIs, for example MLB tackles Load and MRO tackles Handovers. Load and HO have different units and dimensions. So, when a parameter like TTT has to be set (TTT is used by both MLB and MRO), Controller has to understand how good a TTT value is both for MLB and MRO. So if both MLB and MRO express how good a TTT value is in the same scale ([0:10]), it'll be easier for the Controller to understand. Typically, the Controller is not interested in knowing the absolute value of Load for a TTT, it is rather interested in knowing relative goodness of a TTT value.

The configuration may be described by one or more network configuration parameters. Each of the network configuration parameters may have a single value or plural values (e.g. the configuration parameter may be a vector or a matrix). The term "value of the network configuration parameter" covers each of these options for the network configuration parameter. The term "value of the configuration" covers the entirety of the network configuration parameters of the system which are controlled by CAN.

In CAN, there are typically plural CFs with respective objectives. A Controller coordinates the requests among all the CFs. The coordination process is illustrated in FIG. 1. Solid line boxes indicate actions completed by a single entity. Dashed line boxes indicate actions involving multiple entities. The coordination process works as follows:
1. the CF detects those configurations which are currently not optimal,
2. The CF generates corresponding OCRS and UF and sends them to the Controller with a request to recalculate the value of the network configuration parameter.
3. The Controller requests all CFs to send their OCRS and UF,
4. The CFs provide their OCRS and UF,
5. Based on the received OCRSs and UFs, the controller calculates the value which is optimal for the combined interest of the system ([1], [2]) and sets this value in the network.

In the prior art ([1] to [6], particularly in [1] and [3]), CAN has been abstracted as a Multi Agent System (MAS) where the CFs are the agents and the Controller coordinates with them before making any changes to the network configuration parameters. CFs, as agents in the MAS, have the following properties:
P1. Each agent can learn and decide what is the best action for it by itself in a dynamic environment.
P2. No agent can communicate with the other agents, and no one has a complete knowledge of the system.

P3. Some or all of these agents share the same resources and there exist conflicts of interests among them.

P4. Each agent tries to optimize its own target or goal simultaneously with the other agents, and the concept of a common or team goal does not exist.

[1] proposes how to find a good compromise in case of a conflict among the CFs and find a value which is optimal for the combined interest of the system. For example, if there are 2 CFs with interests in the desired value of a configuration parameter, and each CF receives different utilities from the different values, the compromise is computed as the value that maximizes the product of the utilities of the CFs. In [2] this idea was extended when individual interests of CFs on a particular configuration were taken into account while calculating the final value of the network configuration parameter. Interest of a CF on a particular configuration is quantified as config-weight (CW) and the final optimal value is calculated by OCC using Eisenberg-Gale (EG) solution.

[3] proposes two additional functionalities. They may be implemented inside the Controller or external to it (with respective interfaces):

(i) A function (called CM) which can calculate the CW values inside the Controller. Also, CM is the block which communicates with the CFs while an optimal configuration is calculated (as shown in FIG. 3).

(ii) A function (called DM) to stop the CFs from flooding the Controller with configuration recalculation requests. DM puts restrictions on CFs. In detail, DM introduces at least one of
   a) t-value, which specifies the minimum number of requests required to trigger the recalculation of a configuration, and,
   b) m-value, maximum number of requests a CF can make in one cycle. As shown in FIG. 3, MNO specifies the energy savings mode (ESM) in which the system should operate and the frequency of each cycle (f). DM converts these values into t-value and m-value.

REFERENCES

[1] US provisional application U.S. 63/056,084: "AN INTEREST BASED OPTIMAL CONFIGURATION CALCULATION MECHANISM IN COGNITIVE AUTONOMOUS NETWORKS".
[2] PCT/EP2020/061183 "A COORDINATION AND CONTROL MECHANISM FOR CONFLICT RESOLUTION FOR COGNITIVE FUNCTIONS".
[3] A. Banerjee, S. S. Mwanje and G. Carle, "Game theoretic Conflict Resolution Mechanism for Cognitive Autonomous Networks," 2020 International Symposium on Performance Evaluation of Computer and Telecommunication Systems (SPECTS), Madrid, Spain, 2020, pp. 1-8.
[4] PCT/EP2021/054165: "DESIGN OF A ENERGY SAVINGS MODE OF OPERATION FOR COGNITIVE AUTONOMOUS NETWORKS".
[5] Banerjee, A., Mwanje, S. S., & Carle, G. (2020). RAN Cognitive Controller. arXiv preprint arXiv:2010.10278.
[6] Banerjee, A., Mwanje, S. S., & Carle, G. (2021). Optimal Configuration Determination in Cognitive Autonomous Networks. 2021 IFIP/IEEE Symposium on Integrated Network and Service Management (IM), Bordeaux, France, 2021.

SUMMARY

It is an object of the present invention to improve the prior art.

According to a first aspect of the invention, there is provided an apparatus comprising: one or more processors, and memory storing instructions that, when executed by the one or more processors, cause the apparatus to perform: providing to an expectation evaluation device: a configuration parameter of a system and, for at least one of plural cognitive functions, a respective current optimal configuration range set for the configuration parameter received from the respective cognitive function; calculating an optimized value for the configuration parameter based on the current optimal configuration range sets received from the plural cognitive functions; supplying the optimized value of the configuration parameter to the expectation evaluation device; wherein each of the optimal configuration range sets indicates a respective range of desired values for the configuration parameter; and the configuration parameter defines at least a part of a configuration of the system.

According to a second aspect of the invention, there is provided an apparatus comprising: one or more processors, and memory storing instructions that, when executed by the one or more processors, cause the apparatus to perform: receiving an information on a current state of a system; retrieving, for each of the one or more cognitive functions, respective one or more stored triples for a configuration parameter of the system; predicting, for each of the one or more cognitive functions, a respective expected value of the configuration parameter based on the current state of the system and the respective stored triples; receiving a calculated optimized value for the configuration parameter; reducing a potential degradation of a performance of the system based on the expected value for at least one of the one or more cognitive functions and the calculated optimized value for the configuration parameter, wherein for each of the one or more cognitive functions, each of the one or more stored triples comprises an information on a respective previous state of the system, a respective applied value of the configuration parameter, and a respective previous optimal configuration range set for the configuration parameter with respect to the respective cognitive function; for each of the one or more cognitive functions, each of the optimal configuration range sets of the stored triples indicates a respective range of values for the configuration parameter desired previously by the respective cognitive function; the configuration parameter defines at least a part of a configuration of the system; the potential deterioration compares a first performance of the system under an assumption that none of the one or more cognitive functions has manipulative behavior with a second performance of the system under an assumption that at least one of the one or more cognitive functions has manipulative behavior.

According to a third aspect of the invention, there is provided an apparatus comprising: one or more processors, and memory storing instructions that, when executed by the one or more processors, cause the apparatus to perform: monitoring if an instruction is received to set a noise for a configuration parameter of a system; setting the noise if the instruction is received; providing the noise to a controller of the system.

According to a fourth aspect of the invention, there is provided a method comprising: providing to an expectation evaluation device: a configuration parameter of a system and, for at least one of plural cognitive functions, a respective current optimal configuration range set for the configuration parameter received from the respective cognitive function; calculating an optimized value for the configuration parameter based on the current optimal configuration range sets received from the plural cognitive functions;

supplying the optimized value of the configuration parameter to the expectation evaluation device; wherein each of the optimal configuration range sets indicates a respective range of desired values for the configuration parameter; and the configuration parameter defines at least a part of a configuration of the system.

According to a fifth aspect of the invention, there is provided a method comprising: receiving an information on a current state of a system; retrieving, for each of the one or more cognitive functions, respective one or more stored triples for a configuration parameter of the system; predicting, for each of the one or more cognitive functions, a respective expected value of the configuration parameter based on the current state of the system and the respective stored triples; receiving a calculated optimized value for the configuration parameter; reducing a potential degradation of a performance of the system based on the expected value for at least one of the one or more cognitive functions and the calculated optimized value for the configuration parameter, wherein for each of the one or more cognitive functions, each of the one or more stored triples comprises an information on a respective previous state of the system, a respective applied value of the configuration parameter, and a respective previous optimal configuration range set for the configuration parameter with respect to the respective cognitive function; for each of the one or more cognitive functions, each of the optimal configuration range sets of the stored triples indicates a respective range of values for the configuration parameter desired previously by the respective cognitive function; the configuration parameter defines at least a part of a configuration of the system; the potential deterioration compares a first performance of the system under an assumption that none of the one or more cognitive functions has manipulative behavior with a second performance of the system under an assumption that at least one of the one or more cognitive functions has manipulative behavior.

According to a sixth aspect of the invention, there is provided a method comprising: monitoring if an instruction is received to set a noise for a configuration parameter of a system; setting the noise if the instruction is received; providing the noise to a controller of the system.

Each of the methods of the fourth to sixth aspects may be a method of Reducing system degradation.

According to a seventh aspect of the invention, there is provided a computer program product comprising a set of instructions which, when executed on an apparatus, is configured to cause the apparatus to carry out the method according to any of the fourth to sixth aspects. The computer program product may be embodied as a computer-readable medium or directly loadable into a computer.

According to some embodiments of the invention, at least one of the following advantages may be achieved:
The influence of rogue (manipulative) CFs may be limited;
Rogue CFs may be eliminated.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein:

FIG. 13 shows an apparatus according to an example embodiment of the invention;

FIG. 14 shows a method according to an example embodiment of the invention;

FIG. 15 shows an apparatus according to an example embodiment of the invention;

FIG. 16 shows a method according to an example embodiment of the invention; and

FIG. 17 shows an apparatus according to an example embodiment of the invention.

DETAILED DESCRIPTION OF CERTAIN EMBODIMENTS

Herein below, certain embodiments of the present invention are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

Figure 1:
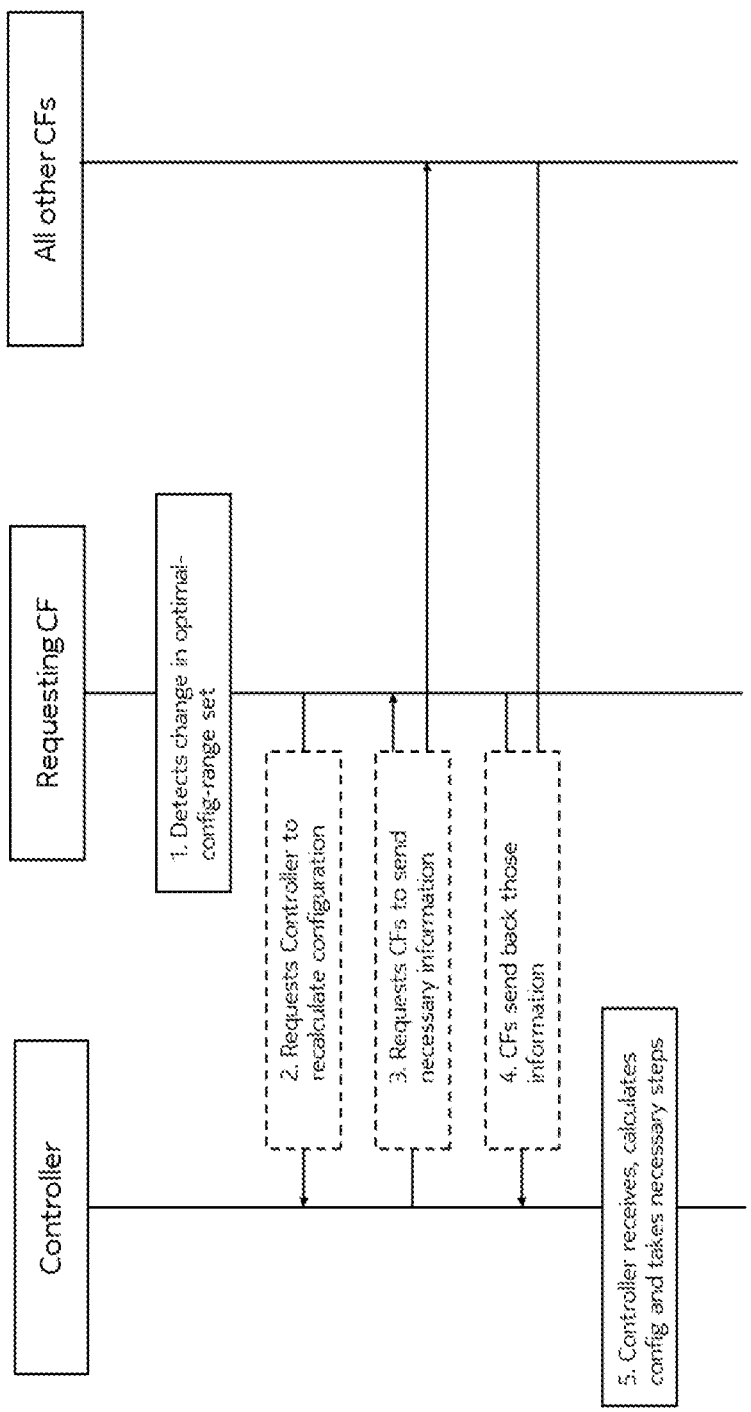
FIG. 1 shows a workflow of a CAN according to the prior art.

As it is clear from the operational procedure of the CAN shown in FIG. 1, the final value of a configuration depends on each of the values proposed by the CFs. So, if a CF behaves unexpectedly and sends deliberately misleading values to the Controller, e.g. to manipulate the Controller to fulfill its own objective, performance of the whole system becomes compromised. This type of manipulative CFs are denoted as Manipulative (or rogue) CF. Some example embodiments of the invention provide a method of handling Manipulative CFs in a CAN such that the deterioration of the overall network performance is reduced or even removed.

Figure 2:
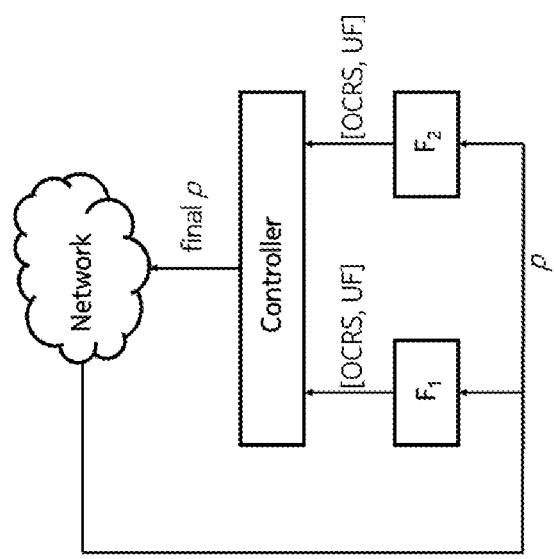
FIG. 2 shows an overview of an example CAN.

Let us consider a CAN with two CFs—$F_1$ and $F_2$, and one Controller as shown in FIG. 2. Let us assume that there is one configuration p which is shared by both $F_1$ and $F_2$ (a real life example $F_1$ being responsible for MLB and $F_2$ being responsible for CCO, and both of them share a TXP). The CAN is deployed in a real-life scenario where the network state (or, external environment) changes from time to time. As already mentioned in prior art [1], [2] and [3], the CFs continuously observe the network states, learn from it and act based on the learning.

Typically (in particular in a multi-vendor scenario), the internal logics and algorithms of the CFs are unknown to Mobile Network Operator (MNO) or the Controller. Thus, before a CF becomes operational, MNO or Controller cannot identify a rogue CF. One example how a Rogue CF may manipulate the Controller is the following: The rogue CF learns how the optimal configuration is calculated. Then, the rogue CF sends deliberately misleading information to Controller every time a configuration is recalculated, e.g. to optimize its own objective, regardless of the objectives of the other CFs.

For example, consider, for the 2-CF CAN in FIG. 2, $F_1$ makes the following observation in the operational mode. In a network state $s_1$, if $F_1$ proposes an OCRS $p_1$ (for the shared network configuration parameter p) to the Controller, the Controller sets the value $t_1$ as the final value. The Controller calculates $t_1$ based on the OCRS and UF received from both of the CFs, setting appropriate weights to those received information.

So, after n number of such instances, $F_1$ is able to learn the relationship among $<s_i, p_i, t_i> \forall i \in \{1, n\}$, i.e., in a network state $s_j$, $F_1$ can predict what the value of $t_j$ will be if it proposes the value $p_j$ to the Controller. According to simulations made by the inventors, in many cases, the prediction is fairly accurate independent from OCRS and UF the controller receives from $F_2$. Now, in a network state $s_{n+1}$, $F_1$ calculates that the optimal value of p for itself is $p_{n+1}$, but, at the same time it predicts that if it proposes the value $p_{n+1}$ to the Controller, the final value will be set at $t_{n+1}$.

Each CF is designed in a way to optimize its objective. So, $F_1$ knows it has to do something so that the final value of p is set at $p_{n+1}$ instead of $t_{n+1}$. To achieve so, $F_1$ may propose a false value $p_{n+1}'$ to increase the chance that when it proposes the value $p_{n+1}'$ to the Controller, the final value will be set at $p_{n+1}$ and its objective will be optimized. In other words, $F_1$ may manipulate the controller to guarantee its ($F_1$'s) objectives. However, such particular optimization may come at the cost of degrading the performance of the entire system.

As another example, a CF may intentionally degrade the performance of the entire system.

If an optimal solution for the entire system is manipulated by a CF (as described above), it may result in a serious performance degradation not only for other CFs but for the overall system (e.g. the mobile network, RAN, etc.), too. So, it is recommendable to detect any manipulative behavior among CFs to prevent the degradation in system performance. However, in general, neither MNO nor the Controller has a prior knowledge on the intentions of a CF (for example in multi-vendor systems). Some example embodiments of this invention provide a solution to handle Rogue CFs in the system, even if their intentions are not known beforehand.

In most previous patent applications and research papers, it has been assumed that all the CFs in the system are trustworthy and none of them has any rogue intentions. However, actually, a Rogue CF might exist in CAN.

A manipulative (or rogue) CF may send deliberately misleading information to the Controller when the Controller is calculating the optimal value of a configuration. The term "deliberately misleading information" means an OCRS and/or UF which is different from the OCRS and/or UF the CF obtains if the CF determines the OCRS and/or UF without having any knowledge how the Controller determines the value of the configuration (i.e. the value $t_i$ in the triple $<s_i, p_i, t_i>$) for the network, based on OCRSs and/or UFs from plural CFs. By sending a deliberately misleading information, the CF may manipulate the Controller such that it determines a value of the configuration which is optimal for said CF only instead of the combined interest of all CFs. This kind of self-interested behavior by a CF may lead to serious performance degradation of the network.

Some example embodiments of the invention exploit the following information in order to reduce or even prevent a serious performance degradation of the system:
- a current state of the system;
- a history of the OCRSs for a configuration parameter provided by one or more of the CFs, together with the state of the system for which the respective OCRS was provided, and the value of the configuration parameter applied in response to providing the respective OCRS;
- a calculated optimized value of the configuration parameter (e.g. based on EG optimization) calculated in response to providing a respective current OCRS provided by the one or more CFs.

For example, to prevent the degradation in system performance by a Rogue CF, some example embodiments of the invention prevent that a rogue CF can predict the relation among $<s_i, p_i, t_i>$. I.e., it is difficult for the rogue CF to learn how the Controller calculates the optimal configuration. Thus, the rogue CF cannot intentionally strongly influence the performance of the system.

In some example embodiments, to prevent a Rogue CF from tracking the relation among $<s_i, p_i, t_i>$ and sending deliberately misleading OCRS and/or UF to the Controller, two additional functionalities are introduced:
 (i) CPT, which checks if, for any configuration, the relation among $<s_i, p_i, t_i>$ is trackable for any CF. To do so, CPT may use a machine learning algorithm (MLA) or a neural network (NN) to learn how $t_i$ varies when $s_i$ and $p_i$ vary. Using the learning, CPT can see if $s_i$ and $p_i$ are given, if CPT's prediction comes close to actual $t_i$.
 (ii) CPC, which adds some error (noise) to the final value of the configuration parameter so that the relation among $<s_i, p_i, t_i>$ is not trackable anymore. Preferably, CPC takes care that, at the same time, system performance does not degrade beyond a certain level for the added noise.

In some example embodiments, CPC and CPT may be considered as a single unit.

Figure 4:
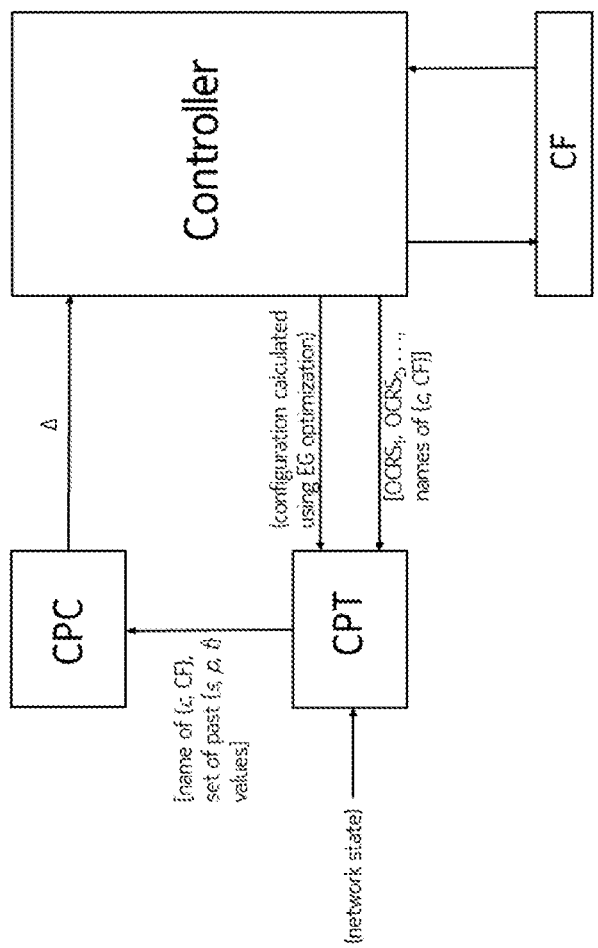
FIG. 4 shows a control architecture of a CAN according to some example embodiments of the invention including interaction of CPT and CPC with the controller.

FIG. 4 shows how these two functions (CPT and CPC) interact with each other and the Controller (comprising CM and OCC). After the Controller recalculates a value of a configuration parameter (an optimized configuration parameter value) based on the OCRSs (and related UFs) received from the CFs, the CPT checks if the calculation method is trackable by any CF. If it is trackable, then CPT forwards this information to CPC which adds some noise to the optimized configuration parameter value so that the relation becomes very difficult to track.

Hereinafter, the interfaces and the end-to-end workflow of CPT and CPC, respectively, are described at greater detail. Also, plural options to implement these functionalities with the Controller and their advantages and disadvantages are described. An end-to-end workflow is explained. The functions, interfaces, and workflows are described for one configuration parameter, but they may be applied to any number of configuration parameters.

To prevent a CF from figuring out the relation among <s, p, t> for a configuration parameter, CPT takes care that there is no apparent relation in <s, p, t>. <s, p, t> designates a set of plural triples <$s_i$, $p_i$, $t_i$> for the same configuration parameter.

Typically, CPT has two major responsibilities:
(i) it stores previous triples <$s_i$, $p_i$, $t_i$> (which are used for inference purposes). This block maintains databases corresponding to each configuration parameter and CF. As soon as OCC recalculates a configuration parameter, this block stores the respective triple in its corresponding database. Alternatively, in some example embodiments, some or all of the triples may be stored externally from the CPT, and CPT may retrieve them when needed.
(ii) it predicts if the relation among <s, p, t> for the configuration parameter is trackable for any CF. This functionality can be implemented using any suitable Machine Learning Algorithm (MLA) or Neural Networks (NN). As soon as OCC recalculates a (optimized) value of the configuration parameter, CPT fetches the latest <s, p, t> values for at least one configuration parameter and at least one of the CFs and checks if the relation among <s, p, t> is trackable to the at least one of the CFs. Preferably, CPT fetches the latest <s, p, t> values for all configuration parameters and all CFs and checks if the relation among <s, p, t> is trackable to any CF. If CPT finds any configuration parameter for which the relation is trackable for any CF, it informs the CPC about the configuration parameter. Preferably, CPT informs CPC without delay. In some example embodiments, CPT may additionally send to CPC the CF for which the relation is trackable. Along with the name of the configuration parameter (and optionally the CF for which the relation is trackable), in some example embodiments, CPT may also send to CPC the database comprising the triples <s, p, t> for this configuration parameter and CF. The database may help CPC in calculating the noise (A) value.

Figure 5:
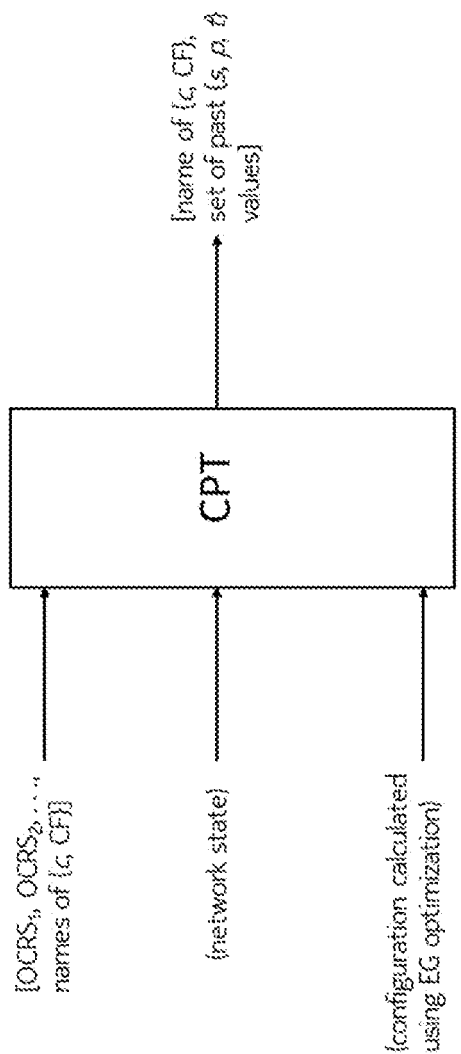
FIG. 5 shows interfaces of CPT according to some example embodiments of the invention.

FIG. 5 shows the interfaces of the CPT:

Inputs of CPT:
(i) network state—it specifies the state of the system (or, generally, state of the external environment being controlled by CAN). E.g., a number of UEs connected to a gNB is an example of a network state, where the system is a network.
(ii) optimized configuration parameter value recalculated by the controller (OCC). It specifies the configuration value, which is close to optimal for the combined interest. It may be calculated e.g. using EG optimization [1].
(iii) [$OCRS_1$, $OCRS_2$, . . . , names of {c, CF}]— a CM sends the following information to the CPT: (i) name of the configuration parameter (c) for which recalculation request has been received, and (ii) OCRS values of all the CFs (or of a subset of the CFs) in the system. In some example embodiments, CM may additionally send to CPT (iii) name of the CF who requested for the recalculation.

Outputs of CPT:
(iv) [names of {c, CF}, set of past {s, p, t} values]—CPT sends the following information to the CPC: (i) name of the configuration parameter (c) for which recalculation request has been received and for which the triple <$s_i$, $p_i$, $t_i$> is trackable for at least one CF. In addition, in some example embodiments, CPT may send to CPC (ii) name of the CF who requested for the recalculation, and, (iii) database of past <s, p, t> values corresponding to that CF and c.

Figure 6:
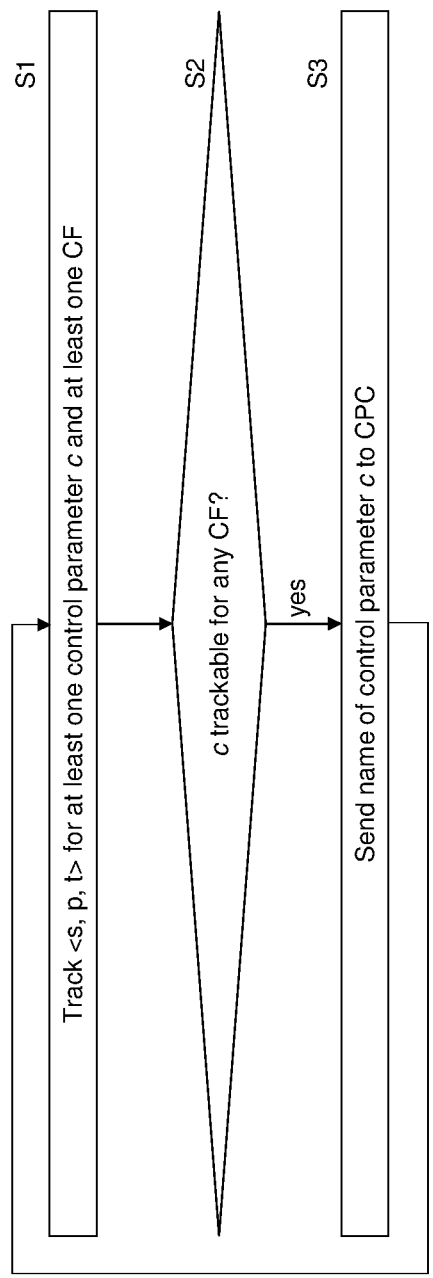
FIG. 6 shows a workflow of CPT according to some example embodiments of the invention.

The task of CPT is to continuously track the relation among <s, p, t> for at least one configuration parameter (preferably for all configuration parameters) and for at least one of the CFs (preferably for all CFs). The workflow of the CPT according to some example embodiments of the invention is shown in FIG. 6.

In S1, CPT tracks the triples <s, p, t> for at least one configuration parameter (preferably for all configuration parameters). Such tracking may be performed when controller receives a request for recalculation of a configuration parameter and the controller provides the calculated optimized value of the configuration parameter to CPT. If CPT finds one configuration parameter c for which the set of triples <s, p, t> is trackable for any CF (S2), CPT sends the name of the configuration parameter c to CPC (S3). This loop may be repeated each time when a request for recalculation of the parameter is received.

If CPC is triggered by CPT to calculate a noise, depending on implementation according to some example embodiments of the invention, there are different options. For example, the noise may be a preset value for the respective configuration parameter. In another example, the noise may be calculated by a (pseudo-)random function, wherein the upper and lower limits are preset for the respective configuration parameter. The noise may have a positive or a negative value.

These options have the advantage of a low computational effort. However, in these options, the noise may be rather small such that the calculation of the optimized configuration parameter might still be trackable with reasonable accuracy and effort for at least one CF, or the noise might be rather large such that the calculation is not trackable any more with reasonable accuracy and effort, but the network performance is considerably deteriorated. Therefore, in some example embodiments, CPC calculates a minimum noise necessary in order to prevent any CF from tracking the calculation.

The minimum noise can be calculated using chi-squared test or $\chi^2$ test. It is given by the following formula $$\chi^2 = \sum \frac{(O_i - E_i)^2}{E_i}$$

The basic idea is as follows: $O_i$ is an observed value of the configuration parameter set by Controller after noise is added from CPC, and $E_i$ is an expected value of that configuration parameter as predicted by the CF. By common practice, one may safely assume that when a CF sees that for a set of its predictions the $\chi^2$ value is greater than a predefined threshold (by common practice, value of this threshold is 0.002 but it may be smaller (e.g. 0.001) or larger (e.g. 0.003)), it gives up on tracking the configuration values set by the Controller and stops manipulative behavior.

This assumed behavior of a rogue CF may be exploited by CPC as follows: From MNO, CPC gets the maximum allowed degradation in overall system performance caused by CPC added noise. This value is called maximum allowable system performance compromise (MASCP). After receiving the MASCP value, CPC calculates plural tentative values for the configuration parameter which ensure that, according to a model available to CPC, system performance does not degrade over MASCP value. In some example embodiments, CPC calculates even all tentative values for the configuration parameter which ensure that, according to the model, system performance does not degrade over MASCP value. The model may be based on prior knowledge of CPC or by some functionality provided by MNO. Out of all the calculated tentative values, CPC selects the one of the values, for example the tentative value which is furthest from the optimized value calculated by OCC. Based on this selection, CPC may determine a difference 6 to be added to or subtracted from the value of the configuration parameter provided by OCC, or it may overwrite the value of the configuration parameter provided by OCC (depending on implementation). For both implementations, the respective value may be denoted a "noise $\Delta$".

Figure 8:
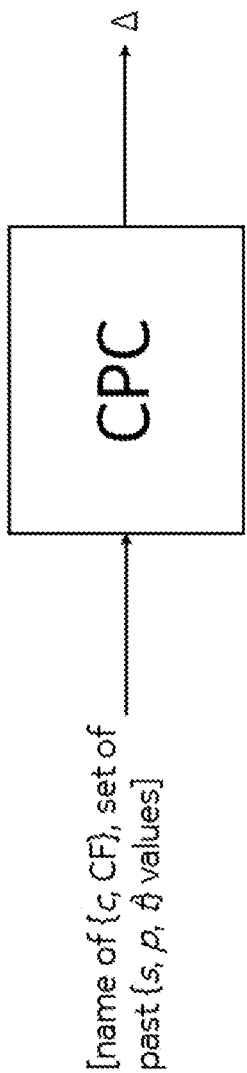
FIG. 8 shows interfaces of CPC according to some example embodiments of the invention.

In general, as shown in FIG. 8, CPC receives at least the name of the configuration parameter c as an input from CPT. In addition, CPC may optionally receive from CPT: a name of a CF for which the calculation may be trackable, and/or the database of previous <s, p, t> triples for the configuration parameter and the CF. Instead of CPT providing the database of previous <s, p, t> triples, controller or CPT may provide each current triple <$s_i$, $p_i$, $t_i$>, and CPC stores them in a database, correspondingly to the storing by CPT. As still another option, CPT and CPC may jointly use one database of previous <s, p, t> triples. In addition, CPT or the controller may optionally inform CPC on the name of the CF which requested recalculation of the configuration parameter.

Based on the stored database of previous <s, p, t> triples for at least one of the CFs and the current state of the system, CPC may make a prediction of the calculated optimized value of the configuration parameter, similarly as it was done by CPT. In some example embodiments, CPT may provide this prediction to CPC. Thus, CPC simulates the expected value $E_i$ of the chi-squared test. Then, CPC may select one of the calculated tentative values for which the value of the chi-squared test is larger than the predefined threshold.

Figure 7:
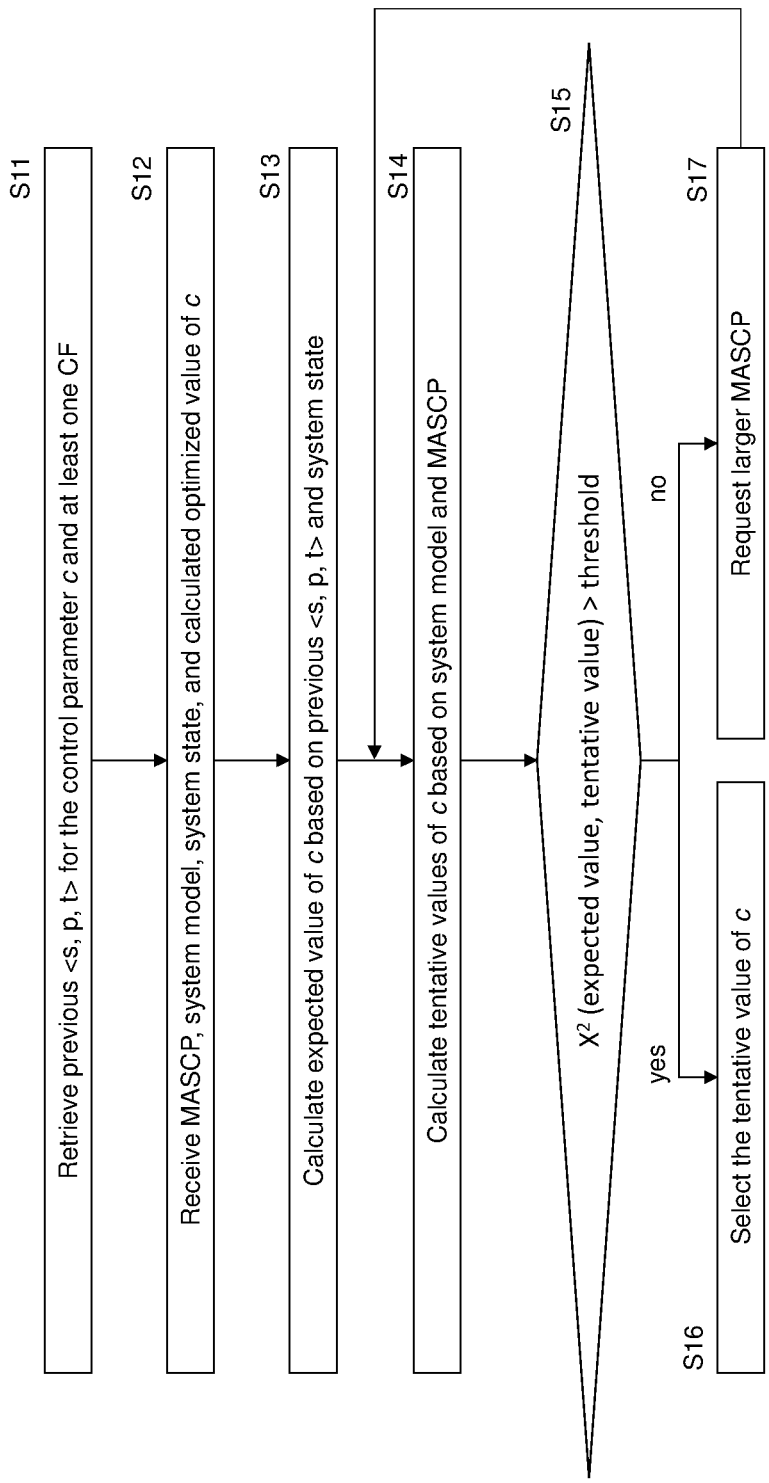
FIG. 7 shows a workflow of CPC according to some example embodiments of the invention.

FIG. 7 shows a workflow of the CPC according to some example embodiments of the invention. In S11, the CPC retrieves the previous triples <s, p, t> for at least one control parameter and at least one CF. In S12, CPC receives from MNO MASCP and the system model based on which the performance of the system is calculated. In addition, CPC receives the current state of the system and the optimized value of the configuration parameter calculated by the controller.

In S13, CPC calculates the expected value of the configuration parameter based on the previous triples <s, p, t> and the current system state. In S14, CPC calculates tentative values of the configuration parameter such that MASCP is not violated.

The sequence of actions S11 to S14 is arbitrary as long as the values needed for the calculations of S13 and S14 are available prior to the calculations. Some of the actions may be performed fully or partly in parallel.

In S15, CPC checks if the value of the chi-squared test is larger than the predefine threshold for at least one of the tentative values. If S15 is affirmative, CPC selects one of these tentative values and determines the noise $\Delta$ based thereon (S16). If S15 is negative, CPC may select a tentative value being furthest from the calculated optimized value (not shown in FIG. 7), or it may request a larger MASCP from MNO (S17). With the larger MASCP, CPC may repeat actions S14 to S17.

In some example embodiments, if such a tentative value does not exist, CPC may request from the MNO a larger MASCP value and calculate further tentative values based on the larger MASCP value. If MNO does not accept the request for a larger MASCP value, CPC may select the tentative value being furthest from the optimized value calculated by the controller. Thus, CPC may calculate a value of the configuration parameter which is closest to the optimized value calculated by the controller to optimize the overall performance and which still prevents the CF from tracking the calculation.

As an output, CPC provides a noise value $\Delta$, which the controller (OCC) may add to the calculated value of the configuration parameter or subtract therefrom, or which replaced the value of the configuration parameter calculated by OCC (depending on implementation).

For the adding (or subtracting) of the noise provided by the CPC, there are at least two options. In a first option, the default output value of CPC (i.e. noise, error) may be 0. Only if instructed by CPT, CPC generates some noise different from 0. The output from CPC is always added to the final value of the configuration calculated by OCC. In a second option, the output value of CPC may be arbitrary if CPC is not instructed to generate some noise. Only if the controller (e.g. an addition stage following OCC) receives an indication that noise from CPC is to be added (because the calculation is trackable), the noise from CPC is added to the output from OCC.

When CPT and CPC are implemented as separate functionalities (as shown in FIG. 4), it has a few advantages:
 (i) MNO has a better understanding of the internal logic and workflow.
 (ii) MNO always has the option of adding or removing them as per requirement, and, thus, can adapt the operational complexity of the system.
 (iii) Controller, CPT and CPC can all come from different vendors, which helps MNO in economic decision making.

However, CPT and CPC can be implemented within the Controller as well. This kind of implementation leaves the MNO little choice of flexibility as the Controller, CPT and CPC have to be manufactured by the same vendor. Also, this kind of design gives very little insight on the internal logic and workflow.

Figure 9:
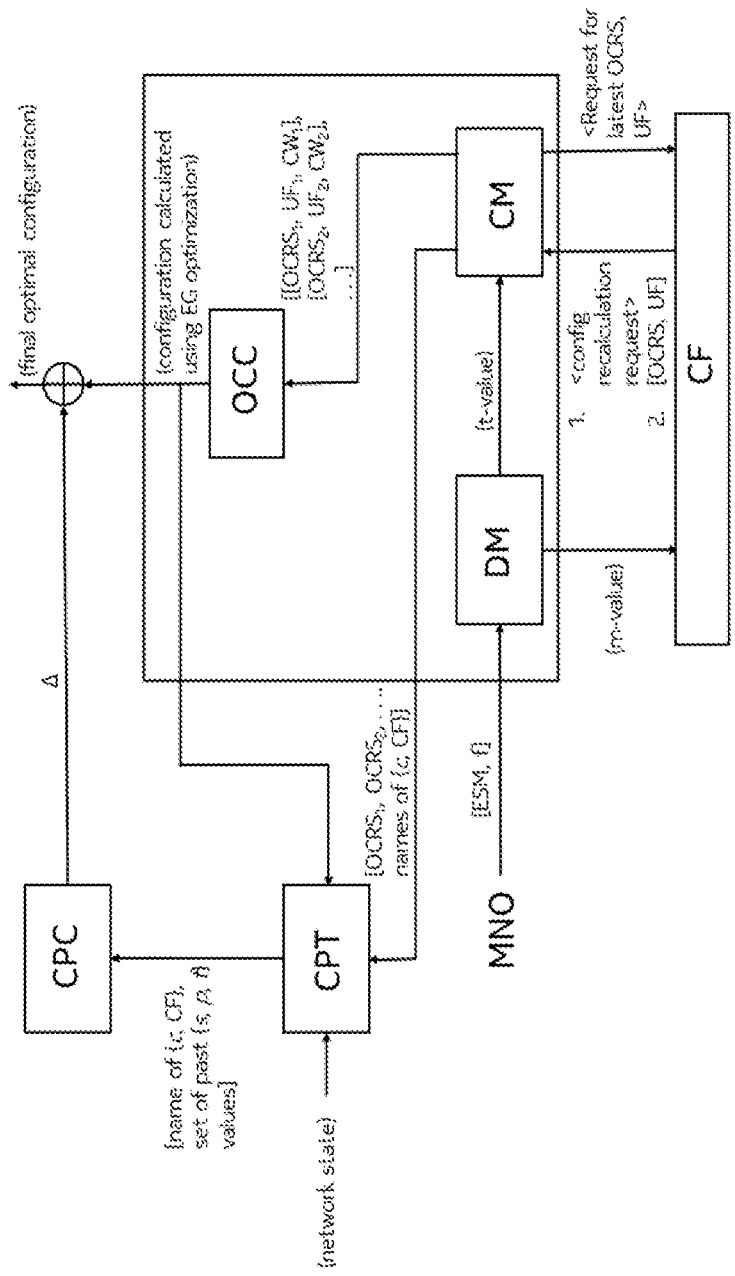
FIG. 9 shows a control architecture of a CAN according to some example embodiments of the invention including interaction of CPT and CPC with the controller.

Architecture of the Controller to which CPT and CPC according to some example embodiments of the invention are added is shown in FIG. 9 with the functionalities and interfaces, including the interfaces to the CFs (shown as a single block). In FIG. 9, the Controller comprises, in addition to CM and OCC, a DM, which is optional.

Figure 10:
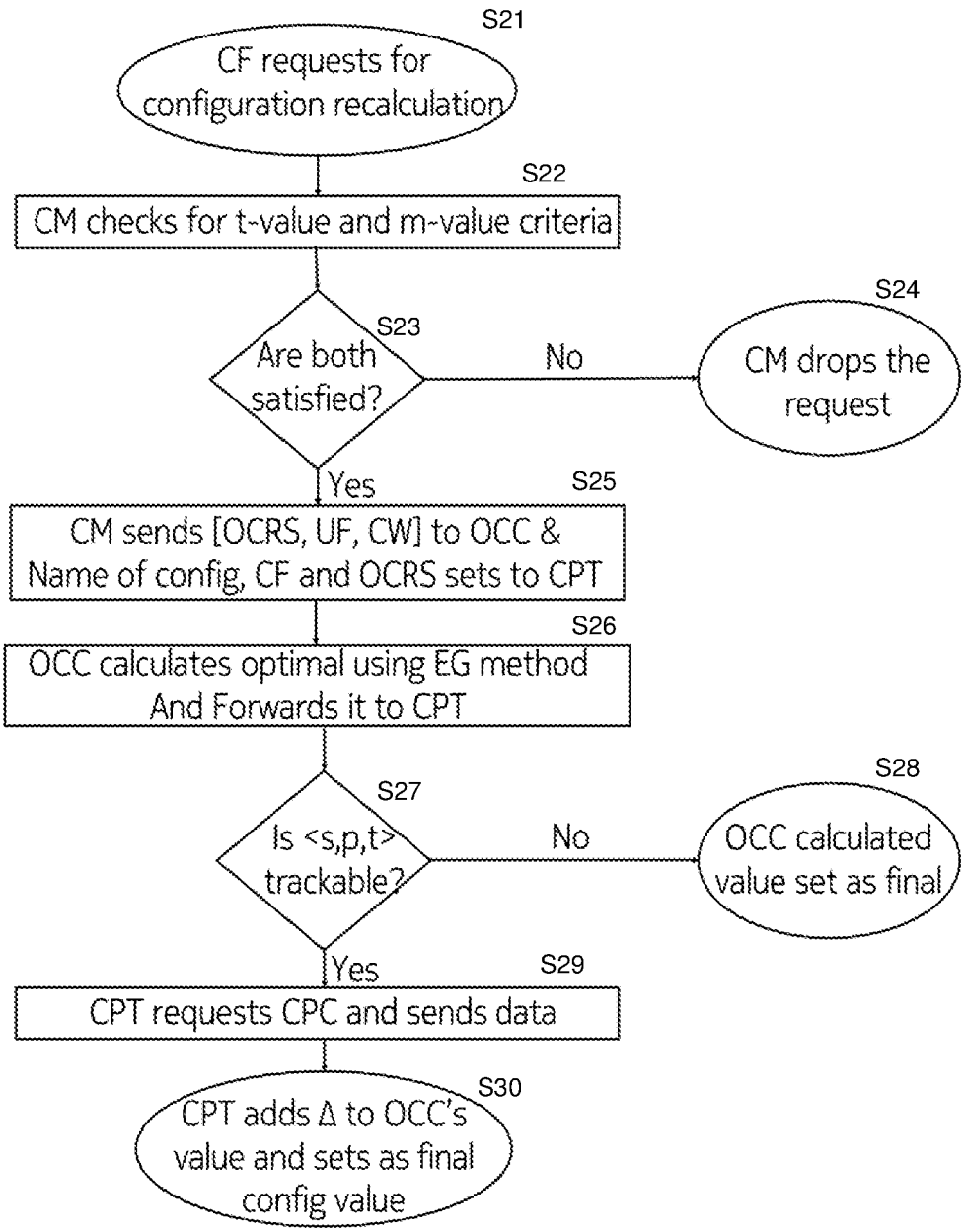
FIG. 10 shows an end-to-end workflow according to some example embodiments of the invention.

FIG. 10 shows how the CPT and CPC work together alongside a Controller. The workflow remains the same in both cases when CPT and CPC are implemented inside or outside of the Controller.

As soon as a CF requests for a configuration recalculation (S21), CM checks if both t-value and m-value conditions are satisfied (S22). If one or both are not satisfied (S23=no), CM drops the request (S24). If both of them are satisfied (S23=yes), or if t-value and m-value are not checked, CM requests all CFs to send their latest OCRSs and UFs. After the CM receives these from all the CFs, it calculates the CW values for each CF and sends [OCRS, UF, CW] value sets to the OCC. The CM also sends name of the configuration parameter and the sets of OCRS received from different CFs to the CPT (S25). After the OCC calculates the optimal value using e.g. EG optimization (as described in [1]), OCC sends this value to the CPT (S26). CPT also gets the current network state and then determines if the relation among <s, p, t> are trackable (S27). If it is not, then the value calculated by OCC is set as final value for the configuration parameter (S28). Otherwise, if CPT finds that the relation is trackable, it sends name of the configuration parameter and (optionally) set of past {s, p, t} values to CPC (S29). Based on these, the CPC sets the value of A. This A is then added to the value calculated by the OCC and set as final value (S30).

An important advantage of some example embodiments of this invention is that it prevents the CFs from tracking how the Controller works. By doing so, possible malicious behaviors of the CFs and their attempts to manipulate the system configuration parameter values can also be prevented.

Figure 12:
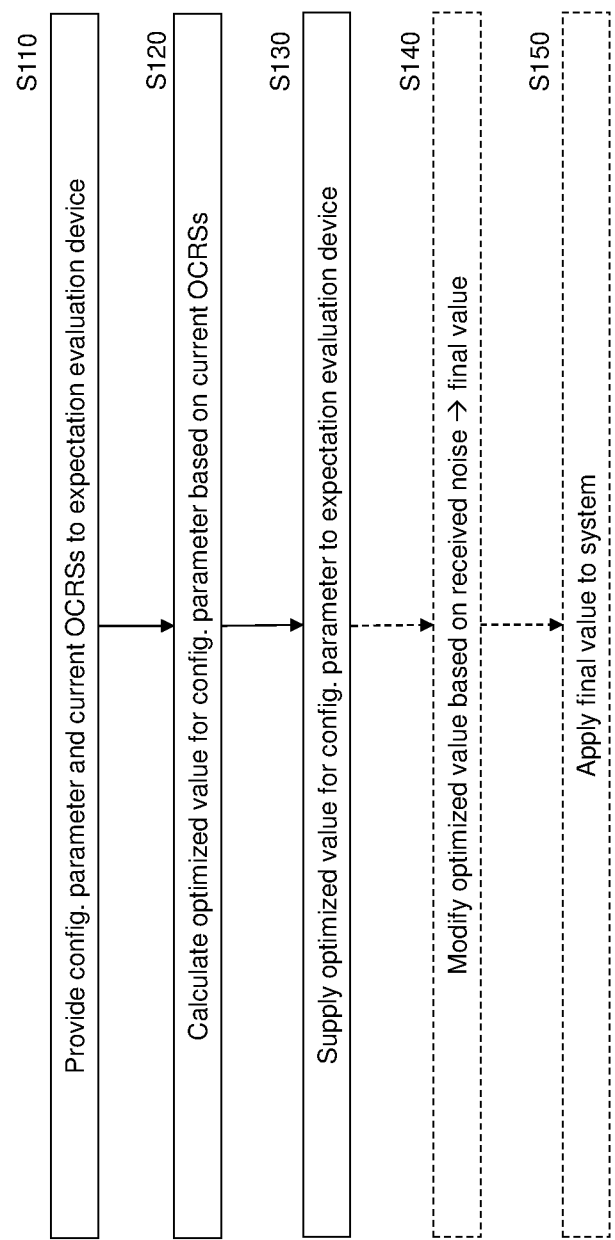
FIG. 12 shows a method according to an example embodiment of the invention.
Figure 11:
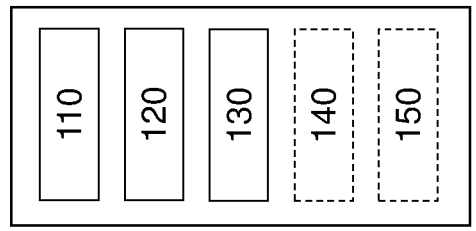
FIG. 11 shows an apparatus according to an example embodiment of the invention.

FIG. 11 shows an apparatus according to an example embodiment of the invention. The apparatus may be a controller, or an element thereof. FIG. 12 shows a method according to an example embodiment of the invention. The apparatus according to FIG. 11 may perform the method of FIG. 12 but is not limited to this method. The method of FIG. 12 may be performed by the apparatus of FIG. 11 but is not limited to being performed by this apparatus.

The apparatus comprises means for providing 110, means for calculating 120, means for supplying 130. In addition, in some example embodiments of the invention, the apparatus may optionally comprise means for modifying 140, and means for applying 150 (shown by dashed lines in FIGS. 11 and 12). The means for providing 110, means for calculating 120, means for supplying 130, means for modifying 140, and means for applying 150 may be a providing means, calculating means, supplying means, modifying means, and applying means, respectively. The means for providing 110, means for calculating 120, means for supplying 130, means for modifying 140, and means for applying 150 may be a provider, calculator, supplier, modifier, and applier, respectively. The means for providing 110, means for calculating 120, means for supplying 130, means for modifying 140, and means for applying 150 may be a providing processor, calculating processor, supplying processor, modifying processor, and applying processor, respectively.

The means for providing 110 provides to an expectation evaluation device, such as a CPT or a CPC: a configuration parameter of a system and, for at least one of plural cognitive functions, a respective current OCRS for the configuration parameter (S110). Each of the OCRSs is received from the respective cognitive function. Each of the OCRSs indicates a respective range of desired values for the configuration parameter. The configuration parameter defines at least a part of a configuration of the system.

Based on the current OCRSs received from the plural cognitive functions, the means for calculating 120 calculates an optimized value for the configuration parameter (S120). The means for supplying 130 supplies the optimized value of the configuration parameter to the CPT (S130).

If the apparatus comprises the means for modifying 140 and the means for supplying 150, the means for modifying 140 modifies the calculated optimized value of S120 by a noise received from e.g. a CPC (S140). Depending on implementation, "modifying" may mean that the calculated optimized value of S120 and the noise undergo some arithmetic operation (such as adding or subtracting), or that the noise replaces the calculated optimized value of S120. Thus, the means for modifying 140 obtains a final value of the configuration parameter. The means for applying 150 applies the final value of the configuration parameter to the system (S150).

FIG. 13 shows an apparatus according to an example embodiment of the invention. The apparatus may be an expectation evaluation device, such as a CPT or a CPC, or an element thereof. FIG. 14 shows a method according to an example embodiment of the invention. The apparatus according to FIG. 13 may perform the method of FIG. 14 but is not limited to this method. The method of FIG. 14 may be performed by the apparatus of FIG. 13 but is not limited to being performed by this apparatus.

The apparatus comprises first means for receiving 210, means for retrieving 220, means for predicting 230, second means for receiving 240, and means for reducing 250. The first means for receiving 210, means for retrieving 220, means for predicting 230, second means for receiving 240, and means for reducing 250 may be a first receiving means, retrieving means, predicting means, second receiving means, and reducing means, respectively. The first means for receiving 210, means for retrieving 220, means for predicting 230, second means for receiving 240, and means for reducing 250 may be a first receiver, retriever, predictor, second receiver, and reducer, respectively. The first means for receiving 210, means for retrieving 220, means for predicting 230, second means for receiving 240, and means for reducing 250 may be a first receiving processor, retrieving processor, predicting processor, second receiving processor, and reducing processor, respectively.

The first means for receiving 210 receives an information on a current state of a system (S210).

The means for retrieving 220 retrieves, for each of one or more cognitive functions, respective one or more stored triples for a configuration parameter of the system (S220). For each of the one or more cognitive functions, each of the one or more stored triples comprises an information on a respective previous state of the system, a respective applied value of the configuration parameter, and a respective previous optimal configuration range set for the configuration parameter with respect to the respective cognitive function. Each of the optimal configuration range sets indicates a respective range of values for the configuration parameter desired previously by the respective cognitive function. The configuration parameter defines at least a part of a configuration of the system.

For each of the one or more cognitive functions, the means for predicting 230 predicts a respective expected value of the configuration parameter (S230). The prediction is based on the current state of the system and the respective stored triples.

The second means for receiving 240 receives a calculated optimized value for the configuration parameter (S240). For example, the second means for receiving may receive the calculated optimized value from a controller of the system.

S210 to S240 may be performed in any arbitrary sequence, if the S210 and S220 are performed prior to S230. They may be performed fully or partly in parallel.

The means for reducing 250 reduces a potential degradation of a performance of the system based on the expected value for at least one of the one or more cognitive functions and the calculated optimized value for the configuration parameter (S250). The potential deterioration compares a first performance of the system under an assumption that none of the one or more cognitive functions has manipulative behavior with a second performance of the system under an assumption that at least one of the one or more cognitive functions has manipulative behavior.

If the apparatus is a CPT, the reducing of the potential degradation of the performance (S250) may comprise: Detecting, for at least one of the one or more cognitive functions, whether or not the calculated optimized value is trackable for the at least one of the cognitive functions based on the respective expected value. If, for the at least one of the one or more cognitive functions, the calculated optimized value is trackable, instructing a CPC to set a noise.

If the apparatus is a CPC, the reducing of the potential degradation of the performance (S250) may comprise: Monitoring if an instruction is received to set a noise for a configuration parameter of a system. If the instruction is received, setting the noise based on the expected value and the calculated optimized value. Providing the noise to a controller of the system.

FIG. 15 shows an apparatus according to an example embodiment of the invention. The apparatus may be a CPC, or an element thereof. FIG. 16 shows a method according to an example embodiment of the invention. The apparatus according to FIG. 15 may perform the method of FIG. 16 but is not limited to this method. The method of FIG. 16 may be performed by the apparatus of FIG. 15 but is not limited to being performed by this apparatus.

The apparatus comprises means for monitoring 310, means for setting 320, and means for providing 330. The means for monitoring 310, means for setting 320, and means for providing 330 may be a monitoring means, setting means, and providing means, respectively. The means for monitoring 310, means for setting 320, and means for providing 330 may be a monitor, setter, and provider, respectively. The means for monitoring 310, means for setting 320, and means for providing 330 may be a monitoring processor, setting processor, and providing processor, respectively.

The means for monitoring 310 monitors if an instruction is received to set a noise for a configuration parameter of a system (S310).

If the instruction is received (S310=yes), the means for setting 320 sets the noise, i.e. a value of the noise (S320). The means for providing 330 provides the noise to a controller of the system (S330).

FIG. 17 shows an apparatus according to an embodiment of the invention. The apparatus comprises at least one processor 810, at least one memory 820 including computer program code, and the at least one processor 810, with the at least one memory 820 and the computer program code, being arranged to cause the apparatus to at least perform at least one of the methods according to FIGS. 12, 14, and 16 and related description.

Some example embodiments of this invention are particularly useful for the operation of Network Automation Functions (NAF) in mobile networks. Some example embodiments are explained with respect to a 5G network (NR). However, the invention is not limited to 5G. It may be used in other networks, too, e.g. in former or forthcoming generations of 3GPP networks such as 4G, 6G, 7G, etc. It may be used in any wireless (mobile) and wireline communication networks. It may be used even outside of communication networks in a system where CFs act as agent of a controller to autonomously influence the configuration of the system. An example of the latter is factory automation. A "network" is a particular case of a "system".

Figure 3:
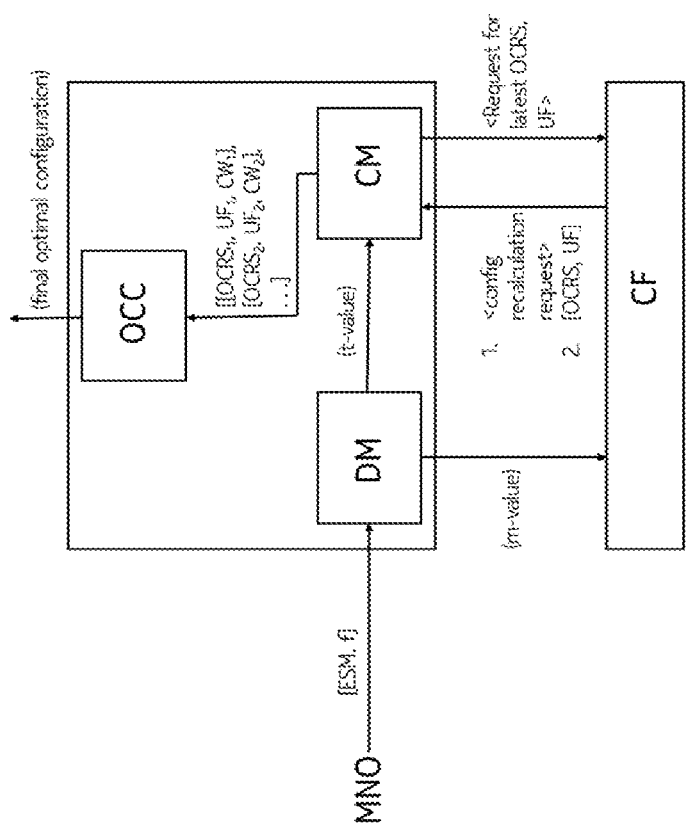
FIG. 3 shows a control architecture of a CAN according to the prior art.

The controller may have a configuration as shown in FIG. 3. However, in some example embodiments of the invention, the controller may comprise additional functions are less functions. For example, in some example embodiments, the controller does not comprise DM, or a DM which calculates only one of the t-value and the m-value. In some example embodiments, one or both of CPC and CPT are integrated with the controller. In some example embodiments, one or both of CPC and CPT are separated from the controller.

Some example embodiments of the invention are described where the controller uses EG optimization in order to recalculate a configuration parameter value. However, the invention is not limited to EG optimization. Other optimization algorithms may be used instead.

Some example embodiments of the invention are described where the rogue CF provides a wrong OCRS to the controller. However, in some example embodiments, the rogue CF may provide a wrong UF or a wrong UF and a wrong OCRS to the controller. However, typically, a wrong UF does not degrade the overall system performance as much as a wrong OCRS.

In some example embodiments, the noise set by CPC may be added or subtracted. However, in some example embodiments, the noise and the calculated value of the configuration parameter may undergo another arithmetic operation such as a multiplication or division (in this case, the noise has a value ~1).

In some example embodiments, CPT and/or CPC may additionally check if they receive an indication ("rogue indication") that a certain CF is suspected for manipulative behavior. For example, a BAD function described in a parallel patent application may provide such an indication, or the MNO may (manually) provide such an indication. In such embodiments, CPT and/or CPC may perform its respective actions only for those CFs for which a rogue indication is received but not for the other CFs.

One piece of information may be transmitted in one or plural messages from one entity to another entity. Each of these messages may comprise further (different) pieces of information.

Names of network elements, network functions, protocols, and methods are based on current standards. In other versions or other technologies, the names of these network elements and/or network functions and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be deployed in the cloud.

According to the above description, it should thus be apparent that example embodiments of the present invention provide, for example, a configuration parameter tracking function such as a CPT, or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example, a configuration parameter camouflaging function such as a CPC, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Each of the entities described in the present description may be embodied in the cloud.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. Method comprising:
receiving an information on a current state of a system;
retrieving, for each of one or more cognitive functions, respective one or more stored triples for a configuration parameter of the system;
predicting, for each of the one or more cognitive functions, a respective expected value of the configuration parameter based on the current state of the system and the respective stored triples;
receiving a calculated optimized value for the configuration parameter;
reducing a potential degradation of a performance of the system based on the expected value for at least one of the one or more cognitive functions and the calculated optimized value for the configuration parameter, wherein
for each of the one or more cognitive functions, each of the one or more stored triples comprises an information on a respective previous state of the system, a respective applied value of the configuration parameter, and a respective previous optimal configuration range set for the configuration parameter with respect to the respective cognitive function;
for each of the one or more cognitive functions, each of the optimal configuration range sets of the stored triples indicates a respective range of values for the configuration parameter desired previously by the respective cognitive function;
the configuration parameter defines at least a part of a configuration of the system;
reducing the potential degradation is based on a comparison of a first performance of the system under an assumption that none of the one or more cognitive functions has manipulative behavior with a second performance of the system under an assumption that at least one of the one or more cognitive functions has manipulative behavior.

2. The method according to claim 1, further comprising:
monitoring if a respective rogue indication is received for at least one of the one or more cognitive functions;
inhibiting the reducing of the potential degradation if the respective rogue indication is not received for at least one of the one or more cognitive functions.

3. The method according to claim 1, further comprising:
predicting, for each of the one or more cognitive functions, the respective expected value of the configuration parameter additionally based on one or more stored utility functions, wherein
a respective stored utility function is stored with respect to at least one of the stored triples;
each of the stored utility functions indicates a quality of the optimal configuration range set of the corresponding stored triple on a universal predefined scale.

4. The method according to claim 1, further comprising:
receiving, for each of the cognitive functions, a respective current optimal configuration range set for the configuration parameter;
storing, for each of the cognitive functions, a respective current triple along with the respective one or more stored triples; wherein,
for each of the cognitive functions, the respective current triple comprises an information on the current state of the system, a currently applied value of the configuration parameter, and the respective current optimal configuration range set for the configuration parameter.

5. The method according to claim 1, wherein the reducing the degradation comprises:
detecting, for at least one of the one or more cognitive functions, whether or not the calculated optimized value is trackable for the at least one of the cognitive functions based on the respective expected value;
instructing a configuration parameter camouflaging function to set a noise if, for the at least one of the one or more cognitive functions, the calculated optimized value is trackable.

6. The method according to claim 4, wherein it is detected that the calculated optimized value is trackable for the at least one of the one or more cognitive functions if an absolute value of a difference between the expected value and the calculated optimized value is less than a predefined threshold.

7. The method according to claim 4, further comprising:
inhibiting the instructing the configuration parameter camouflaging function to set the noise if, for each of the cognitive functions, the respective current triple is not trackable.

8. The method according to claim 1, wherein the reducing comprises:
monitoring if an instruction is received to set a noise for a configuration parameter of a system;
setting the noise based on the expected value and the calculated optimized value if the instruction is received;
providing the noise to a controller of the system.

9. The method according to claim 8, further comprising:
receiving a model for predicting a performance of the system dependent on a value of the configuration parameter;
receiving a value of a maximum allowable system performance compromise;
calculating plural first tentative values of the configuration parameter such that, for each of the plural first tentative values according to the model, a performance of the system is not deteriorated beyond the value of the maximum allowable system performance compromise if the configuration parameter is set to the respective first tentative value;
selecting one of the first tentative values of the configuration parameter different from the calculated optimized value;
determining the noise based on the selected first tentative value.

10. The method according to claim 9, further comprising:
the selecting the one of the first tentative values such that the selected first tentative value is furthest from the calculated optimized value.

11. The method according to claim 9, further comprising:
the selecting the one of the first tentative values such that a value of a chi-squared test between the selected first tentative value and the calculated optimized value is larger than a predefined threshold.

12. The method according to claim 11, further comprising:
checking if for any of the first tentative values the value of the chi-squared test between the respective first tentative value and the calculated optimized value is larger than the predefined threshold;
requesting a larger maximum allowable system performance compromise if the value of the chi-squared test is not larger than the predefined threshold for each of the first tentative values;
calculating plural second tentative values of the configuration parameter such that, for each of the plural second tentative values according to the model, a performance of the system is not deteriorated beyond the value of the larger maximum allowable system performance compromise if the configuration parameter is set to the respective second tentative value;
selecting one of the second tentative values of the configuration parameter such that the value of the chi-squared test between the selected second tentative value and the calculated optimized value is larger than the predefined threshold;
determining the noise based on the selected second tentative value.

* * * * *